United States Patent
Hwang et al.

(10) Patent No.: US 7,256,842 B2
(45) Date of Patent: Aug. 14, 2007

(54) ARRAY SUBSTRATE OF LIQUID CRYSTAL DISPLAY AND FABRICATING METHOD THEREOF

(75) Inventors: Kwang Jo Hwang, Anyang-shi (KR); Woo Hyun Kim, Seoul (KR); Se June Kim, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 686 days.

(21) Appl. No.: 10/183,683

(22) Filed: Jun. 28, 2002

(65) Prior Publication Data

US 2003/0007108 A1 Jan. 9, 2003

(30) Foreign Application Priority Data

Jul. 7, 2001 (KR) ............ 10-2001-40605

(51) Int. Cl.
*G02F 1/1343* (2006.01)
(52) U.S. Cl. ..................... 349/38; 349/147
(58) Field of Classification Search ........... 349/43, 349/147, 38
See application file for complete search history.

(56) References Cited

U.S. PATENT DOCUMENTS

| | | | | |
|---|---|---|---|---|
| 6,081,315 A | * | 6/2000 | Matsuyama et al. | 349/143 |
| 6,100,947 A | * | 8/2000 | Katayama | 349/38 |
| 6,137,551 A | * | 10/2000 | Jeong | 349/38 |
| 6,207,480 B1 | * | 3/2001 | Cha et al. | 438/149 |
| 6,372,535 B1 | * | 4/2002 | Lyu | 438/30 |
| 6,407,780 B1 | * | 6/2002 | Sung | 349/43 |
| 6,528,357 B2 | * | 3/2003 | Dojo et al. | 438/151 |
| 6,696,324 B2 | * | 2/2004 | Hong et al. | 438/149 |
| 6,894,734 B1 | * | 5/2005 | Ihara | 349/38 |

FOREIGN PATENT DOCUMENTS

| | | |
|---|---|---|
| KR | 2001-001426 | 1/2001 |
| KR | 2001-055982 | 7/2001 |

* cited by examiner

*Primary Examiner*—David Nelms
*Assistant Examiner*—Richard H Kim
(74) *Attorney, Agent, or Firm*—Birch, Stewart, Kolasch & Birch, LLP

(57) ABSTRACT

An array substrate of a liquid crystal display being capable of increasing the electrostatic capacitance of a storage capacitor without decreasing the aperture ratio of the LCD. In the array substrate, the gate line is formed a disposed material of a first and a second metal layer. The first metal layer of the gate line is extended on the pixel area.

5 Claims, 15 Drawing Sheets

ARRAY SUBSTRATE OF LIQUID CRYSTAL DISPLAY AND FABRICATING METHOD THEREOF

RELATED APPLICATION

The present application claims, under 35 U.S.C. § 119, the priority benefit of Korean Patent Application No. P2001-40605 filed Jul. 7, 2001, which is herein fully incorporated by reference.

BACKGROUND OF THE INVENTION

1. Field of the Invention

This invention relates to an array substrate of a liquid crystal display and a fabricating method thereof, and more particularly to an array substrate of a liquid crystal display and a fabricating method thereof that is capable of increasing the electrostatic capacitance of a storage capacitor without any decrease of an aperture ratio to reduce flickers and to lessen the number of required processes.

2. Description of the Related Art

Generally, a liquid crystal display LCD controls a light transmittance of a liquid crystal using an electric field to display a picture. To this end, the LCD includes a liquid crystal display panel having liquid crystal pixels arranged in a matrix type, and a driving circuit for driving the liquid crystal display panel.

In the liquid crystal display panel, there are provided a pixel electrode and a common electrode for applying an electric field to each of the liquid crystal pixels. The pixel electrode is formed on a lower substrate by liquid crystal pixels, whereas the common electrode is formed on the entire surface of an upper substrate. Each pixel electrode is connected to a thin film transistor TFT used as a switching device. The pixel electrode together with the common electrode drives the liquid crystal pixel in accordance with data signals supplied through the TFT.

FIG. 1 is a plan view showing an array substrate of a conventional liquid crystal display, FIG. 2 is a sectional view of the array substrate of the liquid crystal display taken along the line "A-A'" shown in FIG. 1.

Referring to FIGS. 1 and 2, a lower substrate 11 of a liquid crystal display includes a TFT 28 located at the intersection of a data line 24 and a gate line 15n, a pixel electrode 33 connected to a drain electrode 25 of the TFT 28, and a storage capacitor 26 located at the overlapping area of the pixel electrode 33 and a previous gate line 15n-1.

The TFT 28 includes a gate electrode 13 connected to the gate line 15n, a source electrode 23 connected to the data line 24, and the drain electrode 25 connected to the pixel electrode 33 through a first contact hole 30a. Also, the TFT 28 further includes a gate insulating film 17 for insulating the gate electrode 13 from the source and drain electrode 23 and 25, and semiconductor layers 19 and 21 for defining a channel between the source electrode 23 and the drain electrode 25 by a gate voltage applied to the gate electrode 13. The TFT 28 responds to a gate signal from the gate line 15 to selectively apply a data signal from the data line 24 to the pixel electrode 33.

The pixel electrode 33 is positioned at a cell area divided by the data line 24 and the gate line 15n, and is made of a transparent conductive material having a high light transmissivity, such as indium tin oxide ITO, etc. The pixel electrode 33 is formed on a second protective layer 31 spread on the entire surface of the lower substrate, is electrically connected to the drain electrode 25 through the first contact hole 30a passing through first and second protective layers 27 and 31. Such a pixel electrode 33 generates a potential difference from a common transparent electrode (not shown) provided at an upper substrate (not shown) by a data signal applied via the TFT. By this potential difference, a liquid crystal positioned between the lower substrate 11 and the upper substrate rotates due to its dielectric anisotropy. In other words, the liquid crystal display changes the molecular arrangement of the liquid crystal cells in accordance with the voltage applied by the pixels, to display images or the like.

FIGS. 3 to 8 are sectional views showing by steps a conventional fabricating method of the liquid crystal display shown in FIG. 2.

Referring to FIG. 3, there are formed the gate electrode 13 and the previous gate line 15n-1 on the lower substrate 11. Aluminum Al or Copper Cu is deposited on the entire surface of the substrate 11 by a known deposition method such as a sputtering method, etc. and is then patterned to form the gate electrode 13 and the previous gate line 15n-1.

Referring to FIG. 4, a gate insulating film 17 is formed over the gate electrode 13 and the previous gate line 15n-1. Then an active layer 19 and an ohmic contact layer 21 are formed on the gate insulating film 17. In this step, an insulating material is entirely deposited to cover the gate electrode 13 and the gate line 15n-1 by a plasma enhanced chemical vapor deposition PECVD method, to form the gate insulating film 17. The active layer 19 and the ohmic contact layer 21 are formed by depositing two semiconductor layers on the gate insulating film 17 and patterning them. Herein, the active layer 19 is formed of amorphous silicon that is not doped with impurities. The ohmic contact layer 21 is formed of amorphous silicon that is extensively doped with impurities of N type or P type.

Referring to FIG. 5, the data line 24 and the source and drain electrodes 23 and 25 are formed on the gate insulating film 17. In this step, a metal is entirely deposited by a CVD technique or sputtering technique and then patterned to form the data line 24 and the source and drain electrodes 23 and 25. The source and drain electrodes 23 and 25 are patterned, and then the area of the ohmic contact layer 21 corresponding to the gate electrode 13 is patterned to expose the active layer 19. The area corresponding to the gate electrode 13 between the source and drain electrodes 23 and 25 in the active layer 19 becomes a channel. The data line 24 and the source and drain electrodes 23 and 25 are formed of chromium Cr or molybdenum Mo.

Referring to FIG. 6, the first protective layer 27 and a storage electrode 29 are formed on the gate insulating film 17. In this step, the first protective layer 27 are formed by depositing an insulating material on the gate insulating layer 17 with the thickness of 1~2 µm to cover the source and drain electrodes 23 and 25. The first protective layer 27 is formed of an organic insulating material with a small dielectric constant such as acrylic organic compound, Teflon, benzocyclobutene BCB, Cytop, or perfluorocyclobutane PFCB.

The storage electrode 29 is formed by depositing a transparent conductive material on the first protective layer 27, and then patterning it. The storage electrode 29 is formed of indium-tin-oxide (ITO), indium-zinc-oxide (IZO), or indium-tin-zinc-oxide (ITZO).

Referring to FIG. 7, the second protective layer 31 is formed on the first protective layer 27 and the storage electrode 29. The first to third contact holes 30a, 30b and 30c are provided through the first and/or second protective layers 27 and 31. In this step, the second protective layer 31 is formed by depositing an inorganic insulating material such as silicon nitride ($SiN_x$) or silicon oxide ($SiO_x$) with the thickness of around 2000~4000 Å. After that, the first to third contact holes 30a, 30b and 30c are formed by selecting removing the first and/or second protective layers 27 and 31 and the gate insulating film 17.

Referring to FIG. 8, the pixel electrode 33 and a transparent electrode 35 are formed on the second protective layer 31 and in the contact holes 30a, 30b and 30c. In this step, the pixel electrode 33 is formed by depositing a transparent conductive material on the second protective layer 31 and the first contact hole 30a, and then patterning it. The pixel electrode 33 is electrically in contact with the drain electrode 25 through the first contact hole 30a. The pixel electrode is formed of any one of ITO, IZO, or ITZO.

The transparent electrode 35 is formed by depositing a transparent conductive material on the second protective layer 31 and the second and third contact holes 30b and 30c, and then patterning it. The transparent electrode 35 is electrically in contact with the storage electrode 29 and the previous gate line 15n-1 through the second and the third contact holes 30b and 30c.

In the foregoing liquid crystal display, if the TFT turns on, electric charge is accumulated at a storage capacitor and a liquid crystal is driven. The flicker occurring during the operation of the liquid crystal display decreases if the difference ($\Delta Vp$) of a descending voltage upon driving in relation to the accumulated voltage at the storage capacitor is smaller. The fluctuating voltage $\Delta Vp$ is decided by the capacitance Cst of the storage capacitor, the capacitance Clc of the liquid crystal, a parasitic capacitance Cgs between the gate electrode 13 and the source electrode 23 of the TFT, and a voltage difference $\Delta Vg$ of the pulse applied to the gate electrode 13. The fluctuating voltage $\Delta Vp$ is defined as follows according to FORMULA (1).

$$\Delta Vp = (C_{gs}/C_{st} + C_{lc} + C_{gs}) * \Delta Vg \quad (1)$$

Herein, Cst represents a capacitance of the storage capacitor, Clc represents a capacitance of the liquid crystal, Cgs represents a parasitic capacitance between corresponding gate and source electrodes, and $\Delta Vg$ represents a difference in the gate voltage.

According to the FORMULA (1) above, to decrease the fluctuating voltage $\Delta Vp$ for reducing flickers, the capacitance Cst of the storage capacitor should be increased, or the capacitor Clc of the liquid crystal or the parasitic capacitance Cgs or the voltage difference $\Delta Vg$ of the gate voltage should be decreased. If the capacitance Clc of the liquid crystal, the parasitic capacitance Cgs, and the gate voltage difference $\Delta Vg$ are invariable, then at least the capacitance Cst should be increased. And to increase the capacitance Cst of the storage capacitor, the area of the storage electrode needs to be increased. However, an increase of the area of the storage electrode decreases the aperture ratio of the LCD. Particularly, the aperture ratio drops significantly in a ferroelectric LCD that requires a high capacitance Cst of the storage capacitor or in an LCD that requires high precision.

Therefore, there is a need to provide an LCD and its fabrication method that overcome these problems of the related art. Further, there is a need to reduce costs associated with the LCD and its fabrication method by eliminating or reducing the use of expensive masks in fabricating processes of the LCD.

SUMMARY OF THE INVENTION

Accordingly, it is an object of the present invention to provide a liquid crystal display (LCD) and a fabricating method thereof that is capable of increasing the electrostatic capacitance of a storage capacitor without decreasing the aperture ratio of the LCD to reduce flickers and lessen the number of fabrication steps.

It is another object of the present invention to provide an LCD and its fabrication method that overcome the problems and disadvantages associated with the related art.

In order to achieve these and other objects of the invention, an array substrate of a liquid crystal display according to an embodiment of the present invention includes a substrate; a plurality of gate lines formed on the substrate; a plurality of data lines formed on the substrate to intersect perpendicularly to the gate lines; pixel areas defined by the gate lines and the data lines; thin film transistors each formed at each intersection of the gate line and the data line; pixel electrodes each formed on each pixel area to be connected to the thin film transistor, wherein the gate lines are formed from a disposed material of a first and second metal layer, and wherein the first metal layer of the gate line is extended on the pixel area.

In the array substrate according to one embodiment, the first metal layer of the gate line is an oxidized metal layer.

In the array substrate according to one embodiment, the first metal layer of the gate line is formed from any one of a titanium oxide and an indium zinc oxide.

In the array substrate according to one embodiment, the first metal layer of the gate line is below 50 Å in the thickness.

In the array substrate according to one embodiment, the second metal layer of the gate line is formed from any one of a copper and an aluminum.

In the array substrate according to one embodiment, the first metal layer of the gate line extended on the pixel area forms a first electrode of a storage capacitor.

In the array substrate according to one embodiment, the thin film transistor includes: a gate electrode connected to the gate line; an active layer formed on a gate insulating film over the gate electrode; a source electrode formed on the active layer and connected to the data line; and a drain electrode formed on the active layer with a constant distance from the source electrode and connected to the pixel electrode, wherein the data line, the source electrode and the drain electrode are formed from a disposed material of a third metal layer and a fourth metal layer.

In the array substrate according to one embodiment, the third metal layer is an oxidized metal layer.

In the array substrate according to one embodiment, the third metal layer is any one of a titanium oxide and an indium zinc oxide.

In the array substrate according to one embodiment, the third metal layer is below 50 Å in the thickness.

In the array substrate according to one embodiment, the third metal layer has a extending part on the pixel, the extending part overlapping the extending part of the first metal layer with the gate insulating film therebetween and forming a second electrode of the storage capacitor.

In the array substrate according to one embodiment, further comprises an insulating film between the second electrode of the storage capacitor and the pixel electrode, wherein the second electrode of the storage capacitor are electrically connected to the pixel electrode through a contact hole formed in the insulating film over the gate line.

In the array substrate according to one embodiment, the storage capacitor formed by the extending parts of the first and third metal layers has the capacitance of above 100 times in opposition to a parasitic capacitor between the gate electrode and the source electrode of the thin film transistor.

A method of fabricating a array substrate of a liquid crystal display according to another aspect of the present invention includes steps of depositing a first metal layer on a substrate; forming an oxidized metal layer by oxidizing the first metal layer; depositing a second metal layer on the oxidized metal layer; forming a photo-resist layer on the second metal layer; patterning the photo-resist layer into a first region with the photo-resist of a first thickness, a second region with the photo-resist of a second thickness and a third region without the photo-resist; etching simultaneously the oxidized metal layer and the second metal layer in the third region; etching the second metal layer in the first region to produce a first metal portion of the oxidized metal layer and a second metal portion having the oxidized and the second metal layers.

In the array substrate according to one embodiment, the oxidized metal layer includes any one of a titanium oxide and an indium zinc oxide.

In the array substrate according to one embodiment, the oxidized metal layer is below 50 Å in the thickness.

In the array substrate according to one embodiment, the second metal layer includes at least one of a copper and an aluminum.

In the array substrate according to one embodiment, the second metal portion is used for a gate line and a gate electrode.

In the array substrate according to one embodiment, the first metal portion is used for an electrode of a storage capacitor.

In the array substrate according to one embodiment, the second metal portion is used for a data line, a source electrode and a drain electrode.

In the array substrate according to one embodiment, the patterning of the photo-resist layer into the first to third regions employs a diffractive mask.

In the array substrate according to one embodiment, the photo-resist layer of the first region corresponds to a thickness of 10~50% in opposition to that of the second region.

In the array substrate according to one embodiment, further comprises an ashing for removing the photo-resist resident on the first region after the etching of the oxidized metal layer and the second metal layer.

In the array substrate according to one embodiment, the forming of the oxidized metal layer includes a exposing of the first metal layer to an $O_2$ plasma.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENTS

With reference to FIGS. 9 to 26, preferred embodiments of the present invention are explained as follows.

Figure 1:
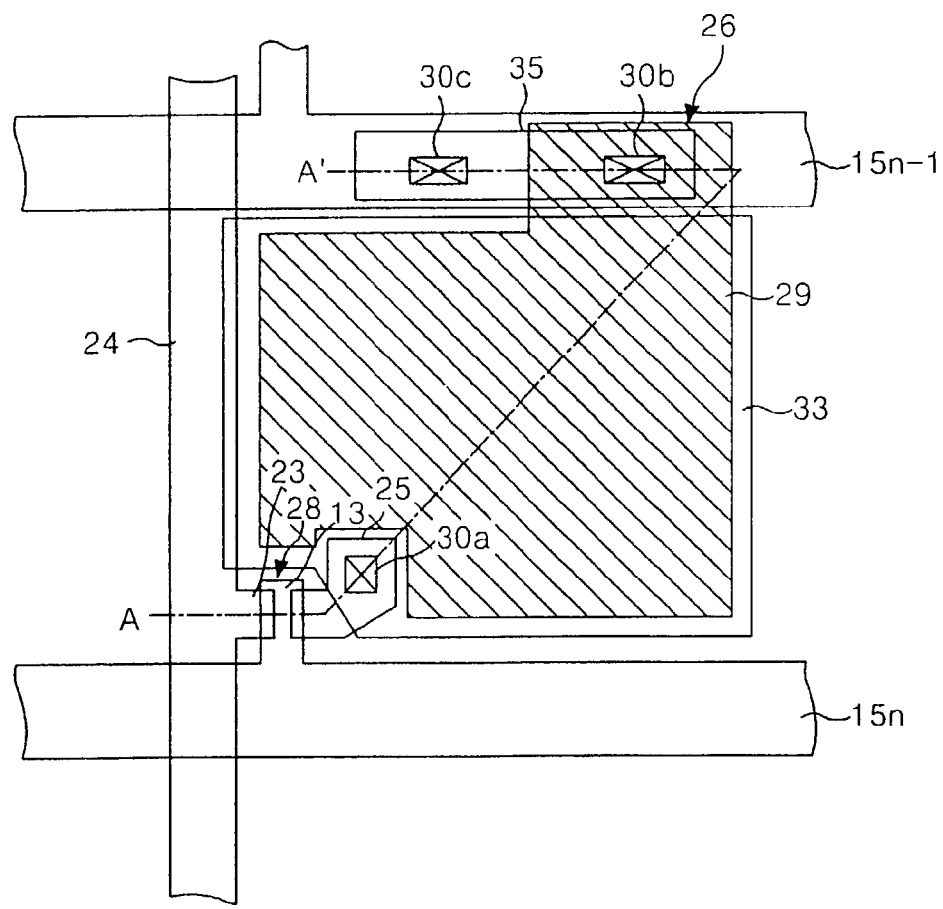
FIG. 1 is a plan view of an array substrate of a liquid crystal display according to a conventional technique.
Figure 2:
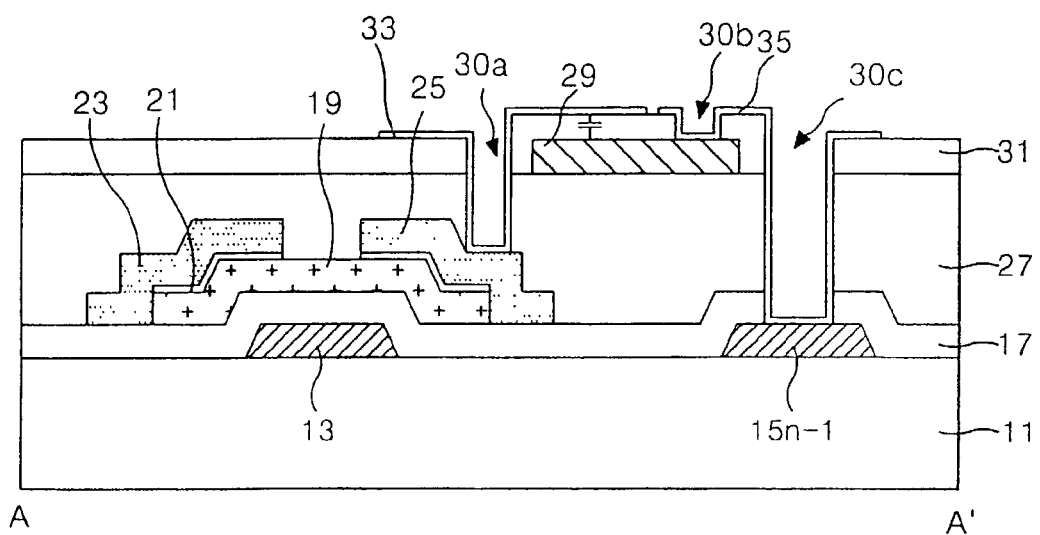
FIG. 2 is a sectional view of the array substrate of the liquid crystal display taken along the line "A-A'" shown in FIG. 1.
Figure 3:
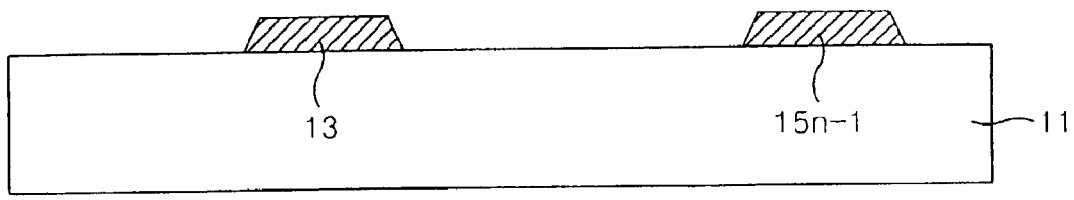
FIGS. 3 to 8 are sectional views representing by steps a conventional fabricating method of the array substrate of the liquid crystal display shown in FIG. 2.
Figure 4:
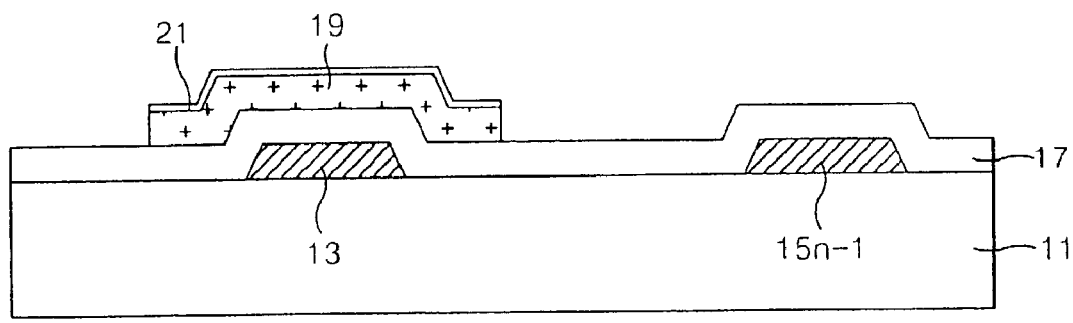
Figure 5:
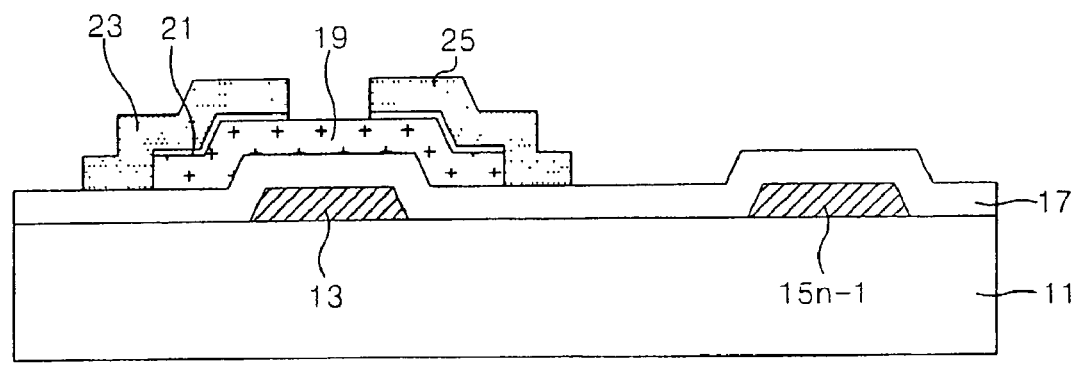
Figure 6:
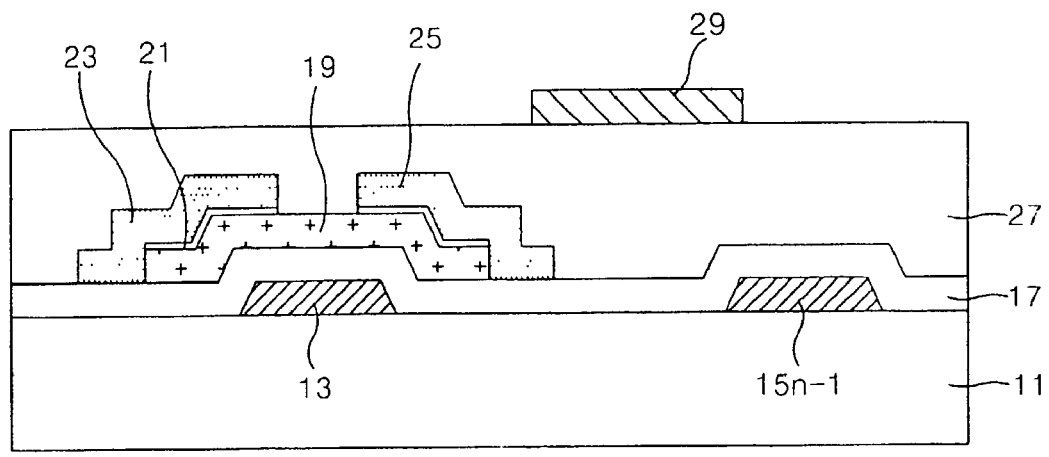
Figure 7:
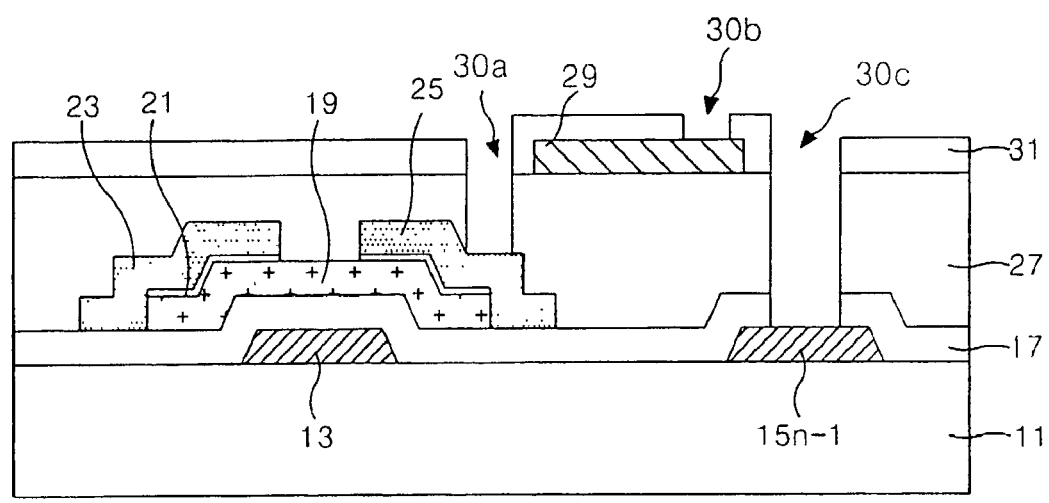
Figure 8:
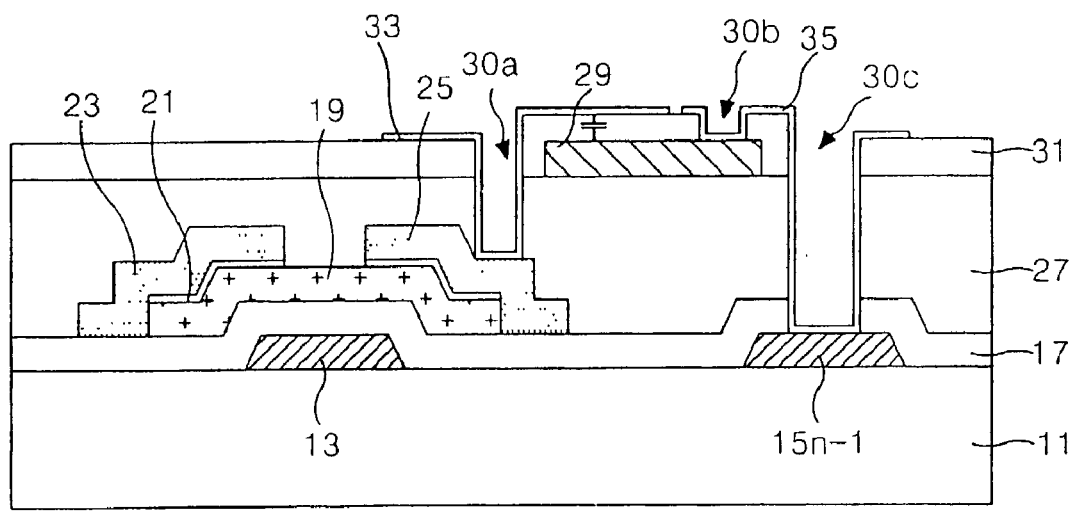
Figure 9:
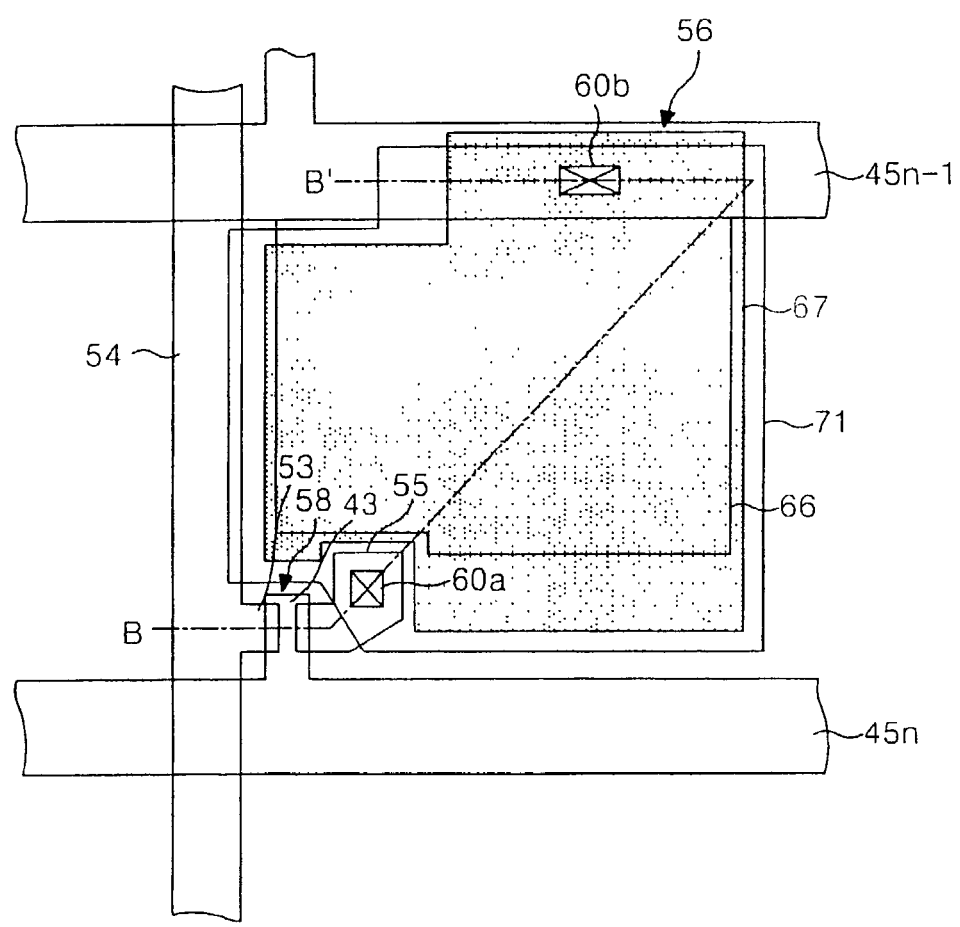
FIG. 9 is a plan view of an array substrate of a liquid crystal display according to an embodiment of the present invention.
Figure 10:
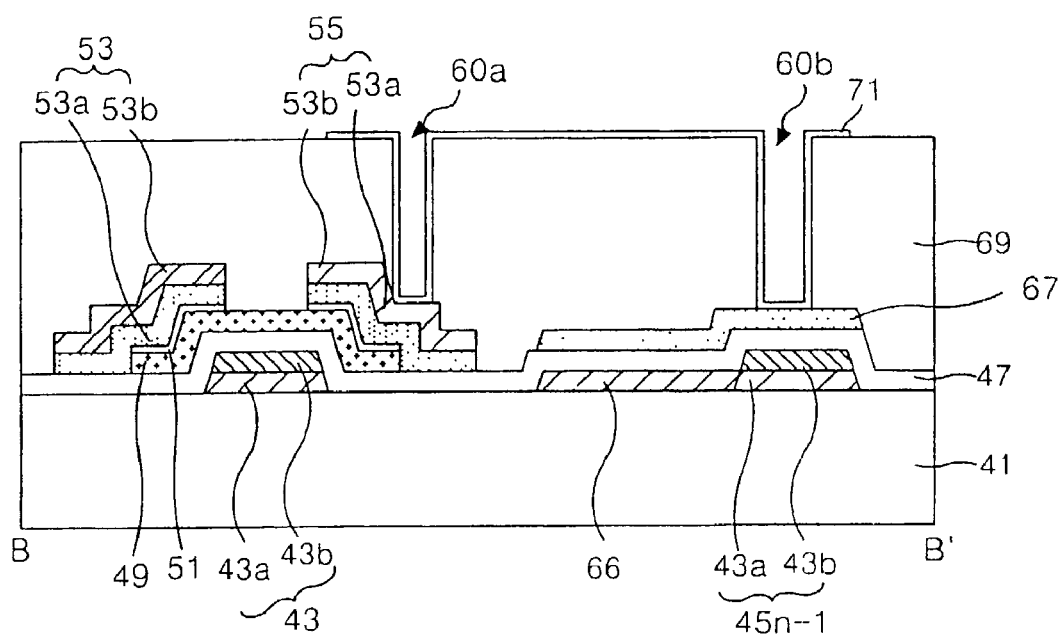
FIG. 10 is a sectional view of the array substrate of the liquid crystal display taken along the line "B-B'" shown in FIG. 9.

Referring to FIGS. 9 and 10, a lower substrate 41 of a liquid crystal display according to an embodiment of the present invention includes a TFT 58 located at the intersection of a data line 54 and a gate line 45n, a pixel electrode 71 connected to a drain electrode 55 of the TFT 58, and a storage capacitor 56 located at the overlapping area of the pixel electrode 71 and a previous gate line 45n–1.

The TFT 58 includes a gate electrode 43 connected to a gate line 45n, a source electrode 53 connected to the data line 54, and a drain electrode 55 connected to the pixel electrode 71 through a first contact hole 60a. The TFT 58 further includes a gate insulating film 47 for insulating the gate electrode 43 from the source and drain electrodes 53 and 55, and semiconductor layers 49 and 51 for defining a channel between the source electrode 53 and the drain electrode 55 by a gate voltage applied to the gate electrode 43. The TFT 58 responds to a gate signal from the gate line 45n to selectively apply a data signal from the data line 54 to the pixel electrode 71.

The pixel electrode 71 is positioned at a cell area divided by the data line 54 and the gate line 45n and is made of, e.g., a transparent conductive material having a high light transmissivity such as indium tin oxide ITO, etc. The pixel electrode 71 is formed on an organic insulating film 69 spread on the entire surface of the lower substrate 41, is electrically connected to the drain electrode 55 through the first contact hole 60a which is formed through the organic insulating film 69, and is electrically connected to a second storage electrode 67 through a second contact hole 60b. Such a pixel electrode 71 generates a potential difference from a common transparent electrode (not shown) provided at an upper substrate (not shown) by a data signal applied via the TFT 58. By this potential difference, a liquid crystal positioned between the lower substrate 41 and the upper substrate rotates due to its dielectric anisotropy. In other words, the liquid crystal display changes the molecular arrangement of the liquid crystal by pixels in accordance with the voltage applied by the pixels, to display pictures, images or any other displayable entity.

FIGS. 11 to 25 are sectional views representing processing steps of a fabricating method of a liquid crystal display shown in FIG. 10 according to an embodiment of the present invention.

Figure 11:
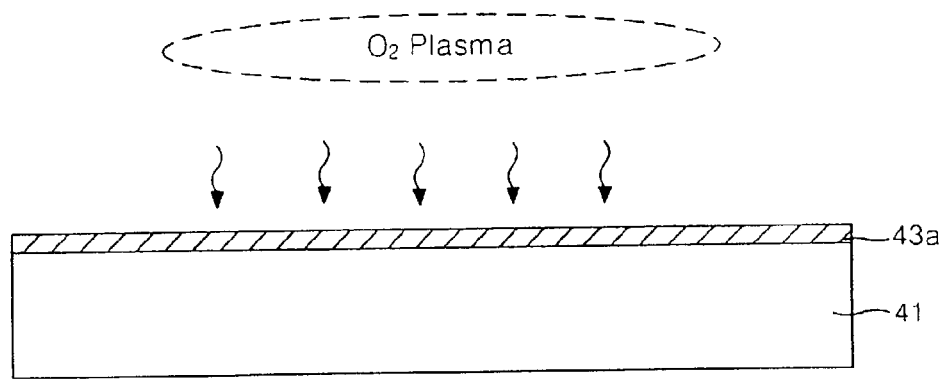
FIGS. 11 to 25 are sectional views representing processing steps of a fabricating method of the array substrate of the liquid crystal display shown in FIG. 10 according to an embodiment of the present invention.

Referring to FIG. 11, a first oxidized metal layer 43a is formed on the substrate 41. In this step, the first oxidized metal layer 43a is formed by depositing titanium Ti or the like with the thickness of around 50 Å using a deposition method such as a sputtering method, etc., and then making it react with oxygen $O_2$ in a plasma state. As a result, the first oxidized metal layer 43a made of a transparent conductive material such as titanium oxide $TiO_x$, ITO, etc. is produced.

Figure 12:
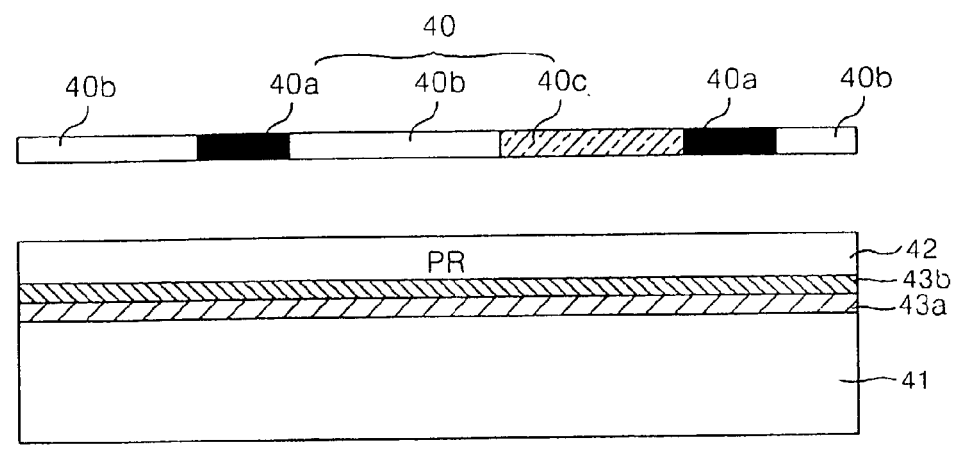

Referring to FIG. 12, a first metal layer 43b and a photoresist 42 are formed on the first oxidized metal layer 43a. A diffractive mask 40 having a shielding part 40a, a transmission part 40b and a diffraction part 40c is arranged over the upper part of the photoresist 42.

Particularly, copper Cu, aluminum Al, or any other suitable metal material is deposited on the first oxidized metal layer 43a by a deposition method such as sputtering, etc. to form the first metal layer 43b. The shielding parts 40a of the diffractive mask 40 correspond respectively to the gate electrode 43 of the TFT 58 and the gate line 45 being a part of the storage capacitor to be defined later. The diffraction part 40c corresponds to the area where a first storage electrode 66 is to be formed. The transmission part 40b corresponds to the other areas. The shielding part 40a of the diffractive mask 40 shuts off UV light, the transmission part 40b transmits the UV light, and the diffractive part 40c transmits around 10-50% of the UV light.

Figure 13:
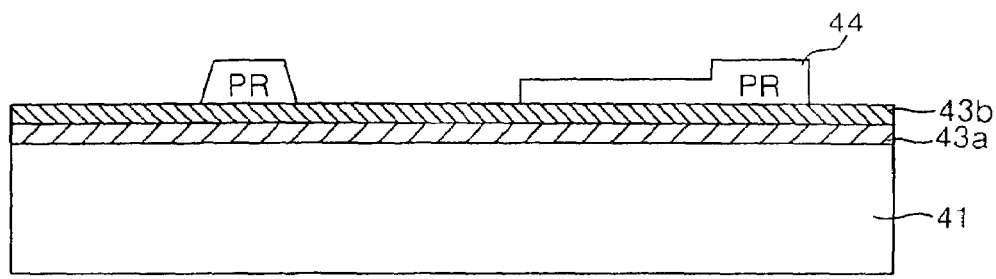

Subsequently, a photoresist pattern 44 is formed on the first metal layer 43b as shown in FIG. 13. The photoresist pattern 44 is formed by developing the photoresist 42 with a developing solution such as alkaline aqueous solution, etc. In the step, the photoresist pattern 44 with its original thickness (before patterning) is formed at an area corresponding to the shielding part 40a of the diffractive mask 40. The photoresist pattern 44 with the thickness of around 10~50% of its original thickness, is formed at an area corresponding to the diffraction part 40c of the mask 40. The photoresist pattern 44 is eliminated at an area corresponding to the transmission part 40b of the mask 40 to expose portions of the first metal layer 43b.

Figure 14:
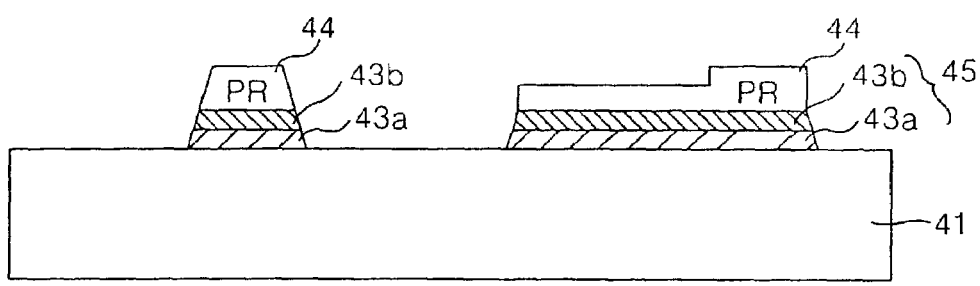

Then, the first metal layer 43b and the first oxidized metal layer 43a on the substrate 41 are patterned as shown in FIG. 14. Portions of the first oxidized metal layer 43a and the first metal layer 43b corresponding to the photoresist pattern 44 remain by a wet etching process. As a result, a gate electrode 43 and a gate line corresponding to the shield parts 40a of the mask 40 are defined.

Figure 15:
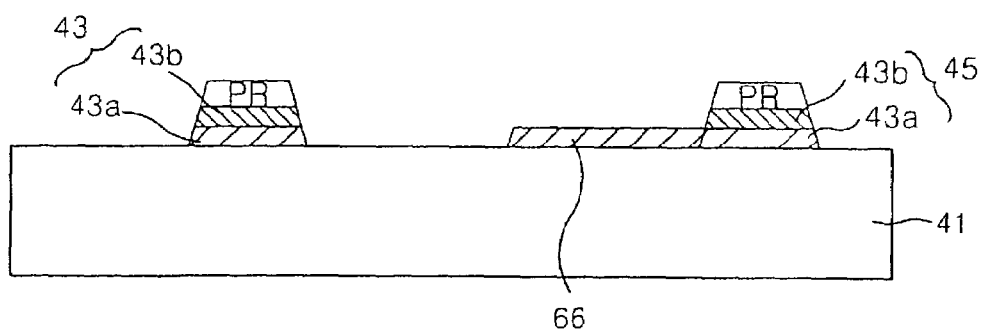
Figure 16:
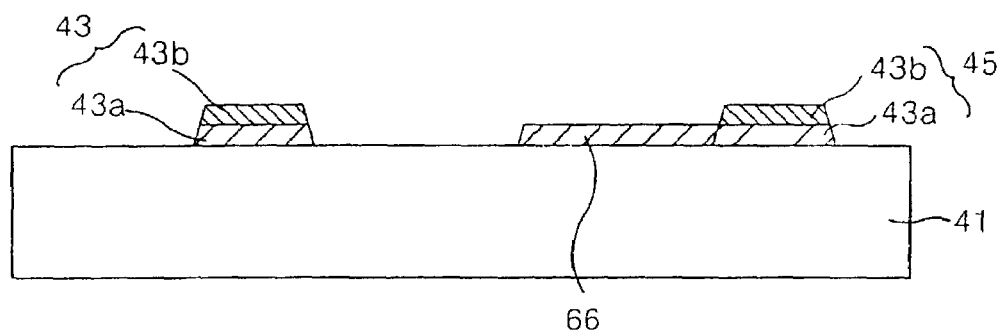

Referring to FIG. 15, the portion of the photoresist pattern 44 with the thickness of around 10~50% of its original thickness is removed by an ashing process or any other suitable process. Then, the exposed portion of the first metal layer 43b is selectively etched. Accordingly, the portion of the first oxidized metal layer 43a corresponding to the diffraction part 40c of the diffractive mask 40 extends or is connected to the gate line 45, and is exposed. As discussed above, portions of the first oxidized metal layer 43a and the first metal layer 43b become the gate electrode 43 of the TFT 58. The portion of the first oxidized metal layer 43a extended to the pixel area becomes the first storage electrode 66. Then, all the photoresist pattern 44 on the gate electrode 43 and the gate line 45 is eliminated as illustrated in FIG. 16.

Figure 17:
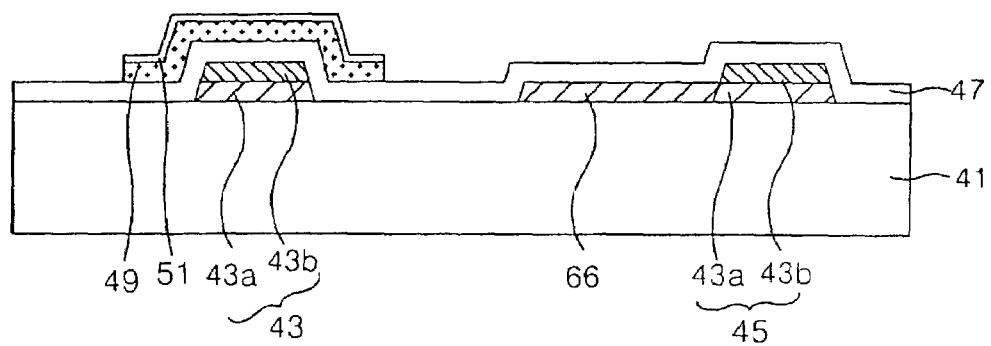

Referring to FIG. 17, a gate insulating film 47, an active layer 49 and an ohmic contact layer 51 are formed on the gate electrode 43 and the gate line 45. This step can be implemented as follows.

Silicon nitride $SiO_x$ or silicon oxide $SiO_x$ is entirely deposited by a PECVD technique in the manner of covering the gate electrode 43 and the gate line 45 to form the gate insulating film 47. Two semiconductor layers are deposited on the gate insulating film 47 and then patterned to form the active layer 49 and the ohmic contact layer 51. Herein, the active layer 49 is formed of amorphous silicon that is not doped with impurities. The ohmic contact layer 51 is formed of amorphous silicon that is extensively doped with impurities of N type or P type.

Figure 18:
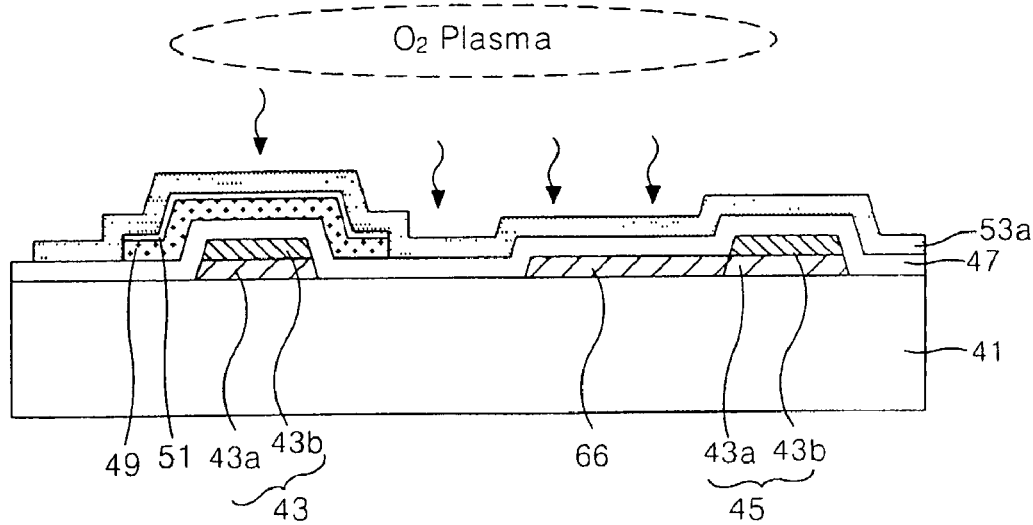

Referring to FIG. 18, a second oxidized metal layer 53a is formed on the gate insulating film 47 and the ohmic contact layer 51. The second oxidized metal layer 53a is formed by a deposition method such as sputtering, etc. Particularly, the second oxidized metal layer 53a is formed by depositing titanium Ti with the thickness of around 50 Å, and then making it react with oxygen $O_2$ in a plasma state. As a result, the second oxidized metal layer 53a made of a transparent conductive material such as titanium oxide $TiO_x$ or ITO is produced.

Figure 19:
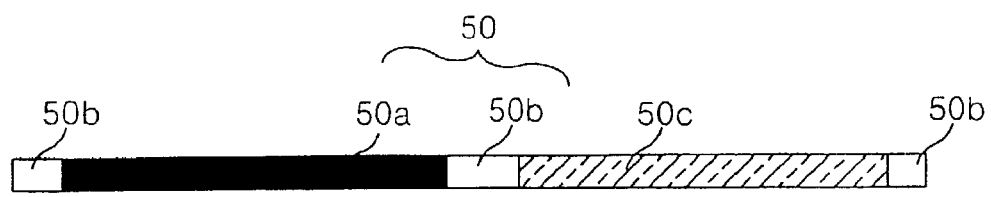
Figure 19:
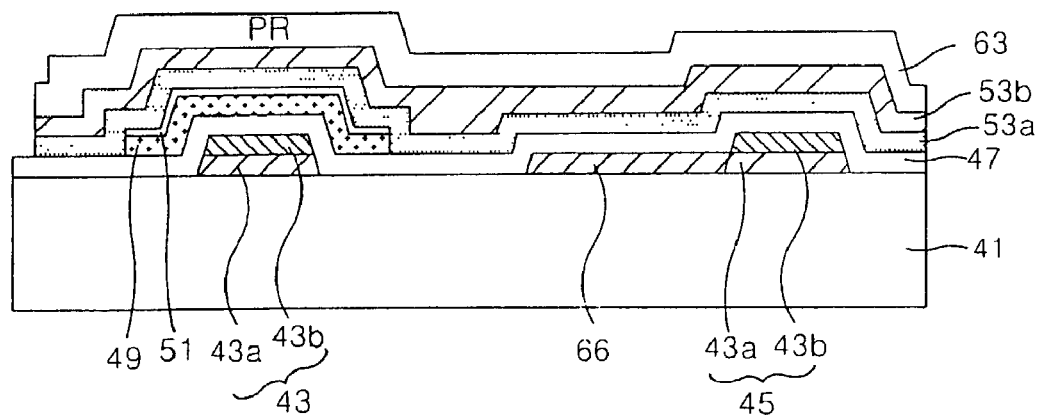

Referring to FIG. 19, a second metal layer 53b and a photoresist 63 are formed on the second oxidized metal layer 53a. A diffractive mask 50 having a shielding part 50a, a transmission part 50b and a diffraction part 50c is arranged over the upper part of the photoresist 63.

More specifically, copper Cu, aluminum Al or any other suitable metal material is deposited by a deposition method such as sputtering, etc. to form the second metal layer 53b on the second oxidized metal layer 53a. The photoresist 63 is formed after entirely depositing the second metal layer 53b on the second oxidized metal layer 53a. The shielding part 50a of the diffractive mask 50 is formed at an area corresponding to the source electrode 53 and the drain electrode 55 of the TFT to be defined later. The diffraction part 50c is formed at an area where a second storage electrode 67 is to be formed. The transmission parts 50b are formed at all the other areas. The shielding part 50a of the diffractive mask 50 shuts off UV light, the transmission part 50b transmits the UV light, and the diffractive part 50c transmits around 10~50% of the UV light.

Figure 20:
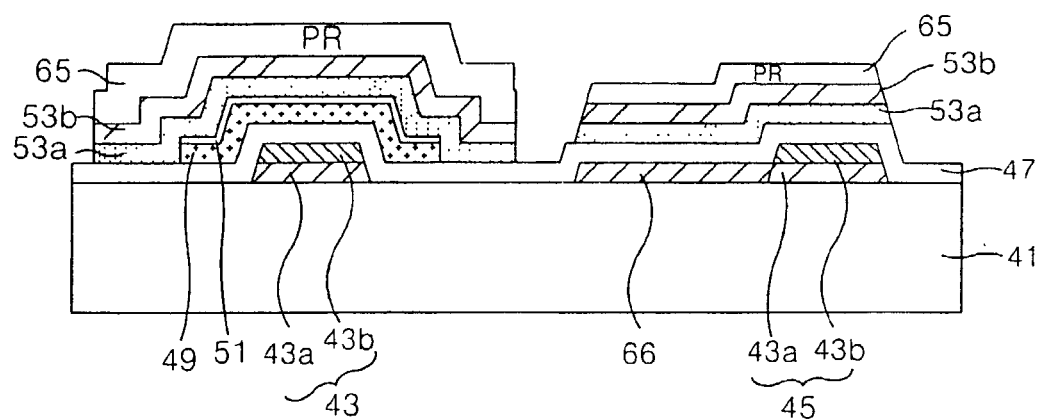
Figure 21:
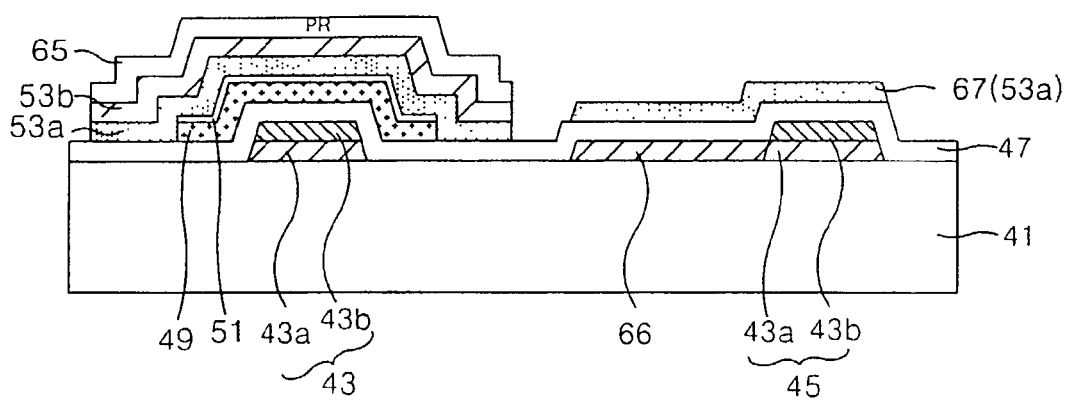

Referring to FIG. 20, a photoresist pattern 65 is formed on the second metal layer 53b. The photoresist pattern 65 is formed by developing the photoresist 63 with a developing solution such as an alkaline aqueous solution, etc. The photoresist pattern 65 having its original thickness (before patterning), is formed at an area corresponding to the shielding part 50a of the diffractive mask 50. The photoresist pattern 65 that has the thickness of 10~50% of its original thickness, is formed at an area corresponding to the diffraction part 50c. The photoresist pattern 65 is eliminated at areas corresponding to the transmission parts 50b to expose parts of the gate insulating film 47.

Then, the second metal layer 53b and the second oxidized metal layer 53a on the ohmic contact layer 51 and the gate insulating film 47 are patterned such that portions of the gate insulating film 47 are exposed. The second oxidized metal layer 53a and the second metal layer 53b only remain at the area corresponding to the photoresist pattern 65 by a wet etching process.

Thereafter, the portion of the photoresist pattern 65 with the thickness of 10~50% of its original thickness is eliminated by an ashing process or any other suitable process. Then, the exposed portion of the second metal layer 53b is selectively etched to expose the portion of the second oxidized metal layer 53a corresponding to the diffraction part 50c of the diffractive mask 50. Herein, this part of the second oxidized metal layer 53a becomes the second storage electrode 67.

Figure 22:
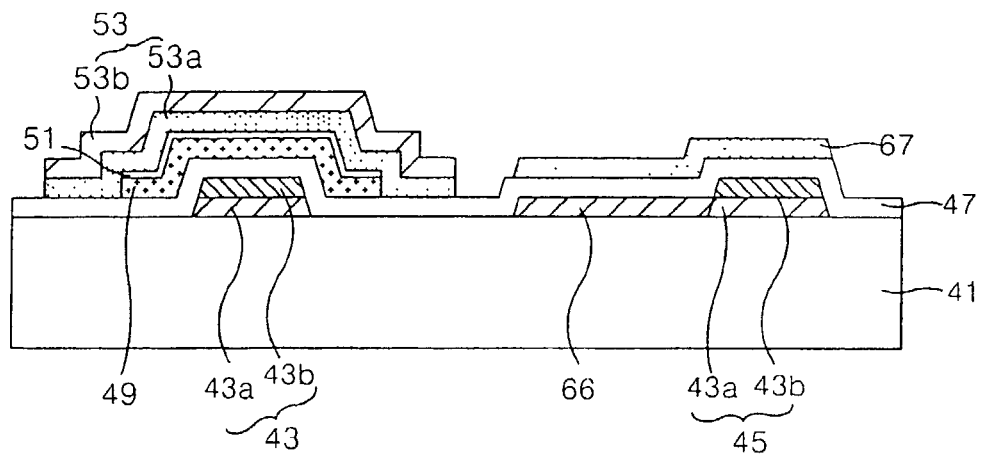

Subsequently, the photoresist pattern 65 on the second metal layer 53b is eliminated as illustrated in FIG. 22.

Figure 23:
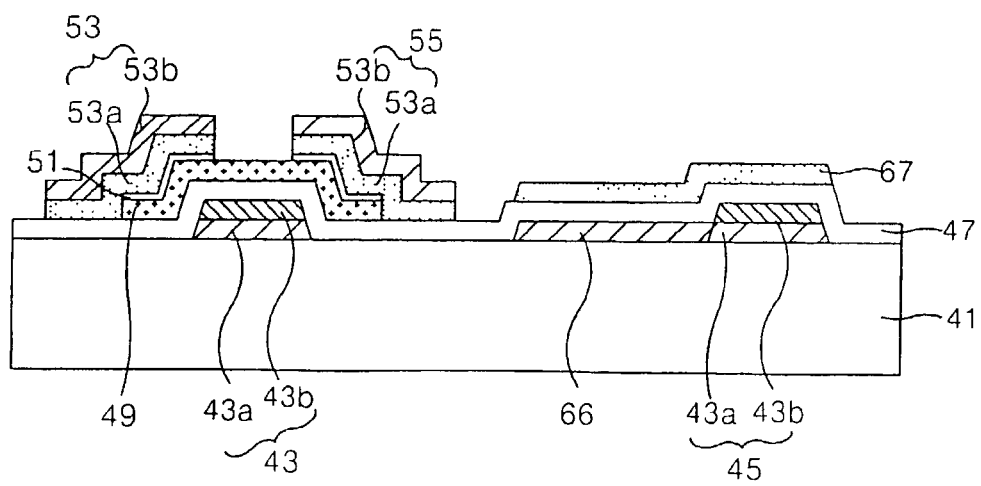

Then there are formed the source electrode 53 and the drain electrode 55 as shown in FIG. 23. In this step, the second oxidized metal layer 53a and the second metal layer 53b of the TFT 58 over the gate electrode 43 are patterned to form the source electrode 53 and the drain electrode 55. The ohmic contact layer 51 at an area corresponding to the gate electrode 43 is patterned to expose a part of the active layer 49. The area corresponding to the gate electrode 43 between the source electrode 53 and the drain electrode 55 becomes a channel in the active layer 49.

Figure 24:
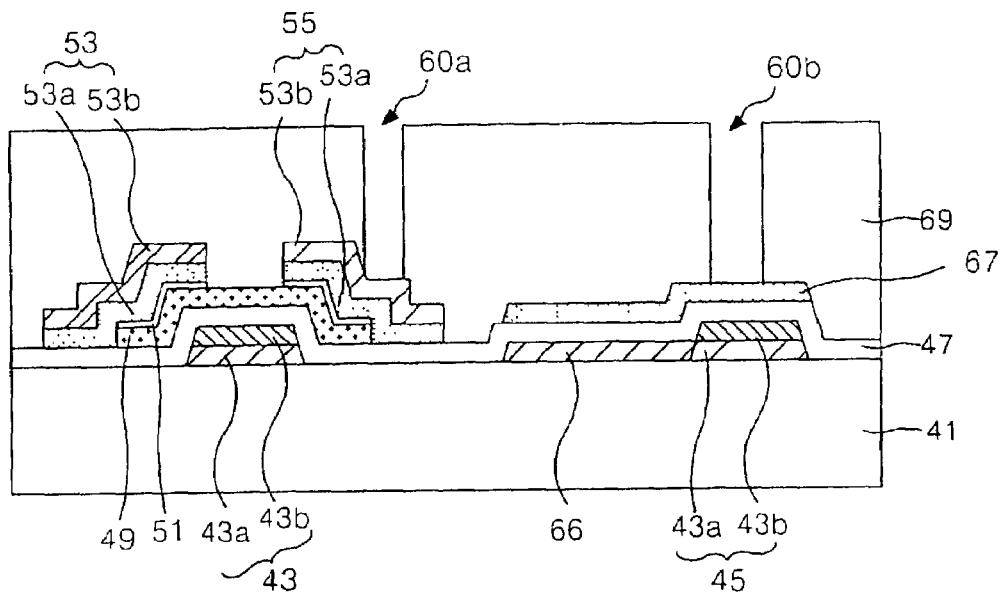

Referring to FIG. 24, an organic insulating film 69 is formed and the first contact hole 60a and the second contact hole 60b are formed through the organic insulating film 69. Particularly, the organic insulating film 69 is formed by depositing an insulating material in the manner of covering the source electrode 53, the drain electrode 55 and the second storage electrode 67. The insulating material is deposited and then patterned to form the first contact hole 60a and the second contact hole 60b through the organic insulating film 69. The organic insulating film 69 is formed of an organic insulating material with a small dielectric constant such as acrylic organic compound, Teflon, benzocyclobutene BCB, Cytop, perfluorocyclobutane PFCB, etc.

Figure 25:
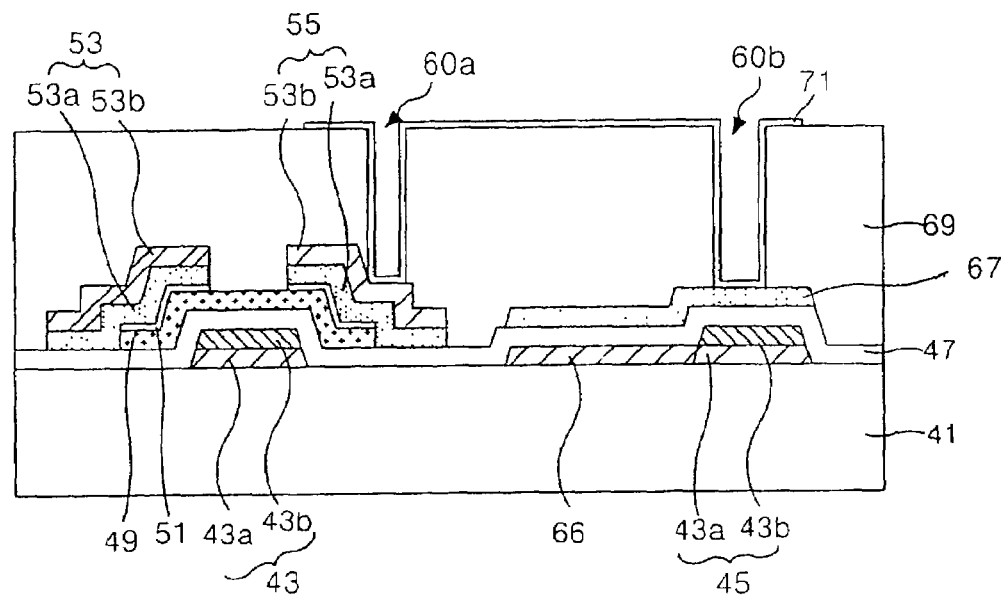

After that, a pixel electrode 71 is formed on the organic insulating film 69 and in the first and second contact holes 60a and 60b as shown in FIG. 25. Particularly, the pixel electrode 71 is formed by depositing a transparent conductive material on the organic insulating film 69 and then patterning it. The pixel electrode 71 is electrically in contact with the drain electrode 55 through the first contact hole 60a. The pixel electrode is formed of any one of ITO, IZO or ITZO.

Figure 26:
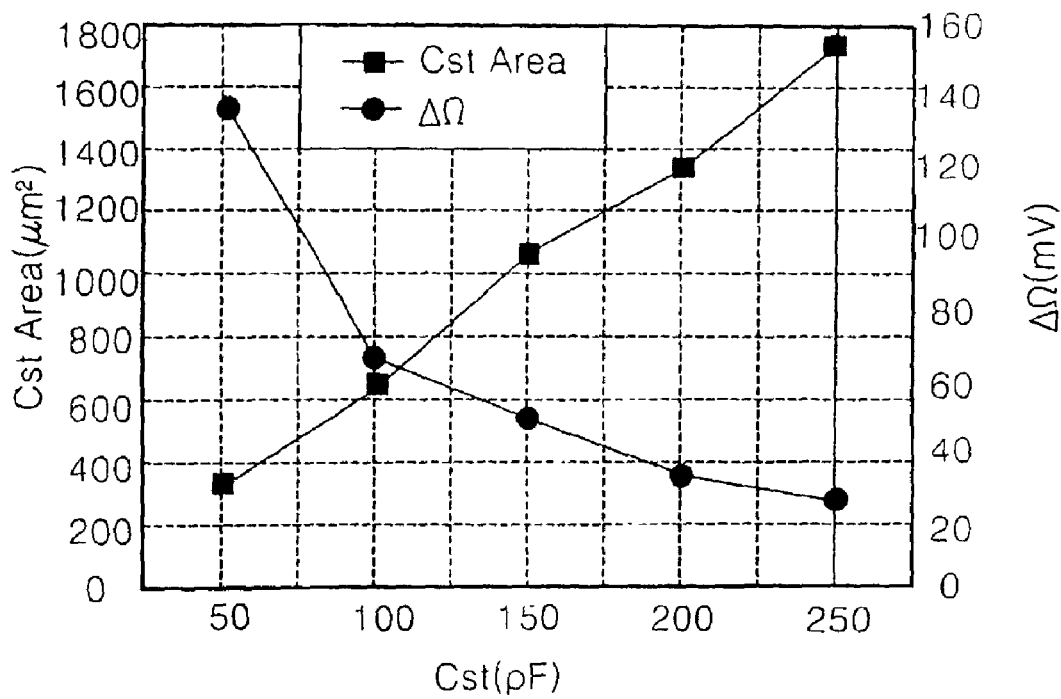
FIG. 26 is a graph showing an example of the relation of capacitance of a capacitor and ΔΩ according to the present invention.

FIG. 26 is a graph showing the relation of a capacitance Cst of a storage capacitor (e.g., formed by the organic insulating film 69 and the first and second storage electrodes 66 and 67) and a fluctuating voltage difference $\Delta\Omega$ according to an embodiment of the present invention.

The fluctuating voltage difference $\Delta\Omega$ is defined by the following FORMULA (2).

$$\Delta\Omega = \Delta Vp_{(max)} - \Delta Vp_{(min)} \qquad (2)$$

Herein, $\Delta\Omega$ is defined as the difference between the maximum value and the minimum value of the fluctuating voltage $\Delta Vp$ which is the difference of the voltage decreased upon its driving in relation to the voltage accumulated to the storage capacitor.

Referring to the graph shown in FIG. 26, if the area of the storage capacitor gets bigger, the capacitance Cst of the storage capacitor increases. Also, if the value of $\Delta\Omega$ gets smaller, the capacitance Cst of the storage capacitor increases. In one example, when the value of $\Delta\Omega$ is about 40 mV in the LCD of the present invention, the capacitance Cst of the storage capacitor is around 200 pF. In this case, the process deviation is 1 µm, the parasitic capacitance Cgs is 2.03 pF, the area of the aperture region is 2005 µm$^2$, and the capacitance Cst of the storage capacitor is larger than 100 times the deviation value of the parasitic capacitance Cgs.

In the present invention, if the value of $\Delta\Omega$ gets bigger, residual images occur on a screen because the difference of the maximum value and the minimum value of the fluctuating voltage is increased. To prevent displaying of the residual images, in accordance with one embodiment the value of $\Delta\Omega$ should be made less than 50 mV. Thus, in the present invention, the area of the storage capacitor is made to be big or the value of $\Delta\Omega$ is made smaller for increasing the capacitance Cst of the storage capacitor.

As described above, the liquid crystal display and the fabricating method according to the present invention is capable of increasing the capacitance of the storage capacitor without decreasing an aperture ratio of the LCD, whereby flickers are reduced or eliminated. Also, because the number of masks being used is reduced or is not increased, the fabrication cost can be reduced when compared with a conventional fabrication method of a liquid crystal display.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. An array substrate of a liquid crystal display, comprising:
    a first part of a gate line formed of a first oxidized metal layer on a substrate;
    a first part of a gate electrode on the substrate, and a first storage electrode extending from the first part of the gate line;
    a second part of the gate line and a second part of the gate electrode formed on the first part of the gate line and the first part of the gate electrode, respectively, and formed of a first metal layer;
    a gate insulating film entirely formed on the gate line, the gate electrode and the first storage electrode;
    a semiconductor layer formed on the gate insulating film to partially overlap with the gate electrode and the gate line;
    a first part of a data line formed on the semiconductor layer and formed of a second oxidized metal layer;
    a first part of a source electrode formed at one end of the semiconductor layer and extending from the data line;
    a first part of a drain electrode formed at another end of the semiconductor layer and separated from the source electrode;
    a second storage electrode overlapping the first storage electrode with the gate insulating film therebetween;
    a second part of the data line, a second part of the source electrode, and a second part of the drain electrode formed of a second metal layer, and formed to overlap with the first part of the data line, the first part of the source electrode and the first part of the drain electrode, respectively;
    an organic insulating film covering the data line, the source electrode, the drain electrode and the second storage electrode; and
    a pixel electrode in contact with the second part of the drain electrode and the second storage electrode respectively through a first contact hole and a second contact hole formed in the organic insulating film.

2. The array substrate according to claim 1, wherein an area of the first storage electrode and the second storage electrode is not less than at least ⅓ of a pixel area.

3. The array substrate according to claim 1, wherein a capacitance of a capacitor formed by the organic insulating film and the first and second storage electrodes is not less than 100 times a deviation of a parasitic capacitance formed by the gate electrode and the source electrode.

4. The array substrate according to claim 1, wherein at least one of the first and second oxidized metal layers is made of any one of titanium oxide $TiO_x$ or indium zinc oxide IZO.

5. The array substrate according to claim 1, wherein a thickness of at least one of the first and second storage electrodes is not thicker than 50 Å.

* * * * *